(12) United States Patent
Fuka et al.

(10) Patent No.: US 9,503,461 B2
(45) Date of Patent: *Nov. 22, 2016

(54) AUTHENTICATION BASED ON PROXIMATE DEVICES

(71) Applicant: International Business Machines Corporation, Armonk, NY (US)

(72) Inventors: Louis T. Fuka, Austin, TX (US); Susann M. Keohane, Austin, TX (US); James R. Kraemer, Santa Fe, NM (US)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 0 days.

This patent is subject to a terminal disclaimer.

(21) Appl. No.: 14/585,237

(22) Filed: Dec. 30, 2014

(65) Prior Publication Data
US 2016/0191540 A1    Jun. 30, 2016

(51) Int. Cl.
*H04L 29/06*    (2006.01)
*H04W 12/06*    (2009.01)
*G06Q 20/40*    (2012.01)
*G06F 17/30*    (2006.01)

(52) U.S. Cl.
CPC ............. *H04L 63/107* (2013.01); *H04L 63/12* (2013.01); *H04W 12/06* (2013.01); *G06F 17/30917* (2013.01); *G06Q 20/4014* (2013.01)

(58) Field of Classification Search
CPC . G06F 21/57; G06F 17/30917; H04L 63/12; G06Q 20/4014; G06Q 20/4016; G06Q 20/3223
See application file for complete search history.

(56) References Cited

U.S. PATENT DOCUMENTS 6,889,210 B1 * 5/2005 Vainstein ............ G06F 21/6209
                                                 380/201
7,003,316 B1 * 2/2006 Elias .................... G06Q 20/20
                                                 455/11.1
(Continued)

OTHER PUBLICATIONS

List of IBM Patents or Patent Applications Treated as Related; (Appendix P), Filed Aug. 23, 2015; 2 pages.
(Continued)

*Primary Examiner* — Hadi Armouche
*Assistant Examiner* — Sher A Khan
(74) *Attorney, Agent, or Firm* — Cantor Colburn LLP; Kevin Jordan (57) ABSTRACT

In one embodiment, a computer-implemented method includes, in response to an attempt by a user to perform a transaction using a computing device, accessing a communication device connected to the computing device. A presence of one or more nearby devices, with respect to the computing device, is detected through use of the communication device connected to the computing device. A mapping of nearby devices to trust levels may be applied to the one or more nearby devices. In the mapping, each group of one or more nearby devices maps to a trust level of two or more trust levels. An assigned trust level for the transaction is determined, by a computer processor, based on applying the mapping of nearby devices to trust levels. The mapping of nearby devices to trust levels is modified based on the one or more nearby devices detected. The modified mapping is used for future transactions.

12 Claims, 7 Drawing Sheets

(56) References Cited

U.S. PATENT DOCUMENTS

| | | | |
|---|---|---|---|
| 8,006,280 B1* | 8/2011 | Hildebrand | G06F 21/6218 380/277 |
| 8,346,217 B2* | 1/2013 | Crawford | H04W 12/06 455/410 |
| 8,369,842 B2* | 2/2013 | Proctor, Jr. | G06Q 30/0623 455/414.3 |
| 9,177,129 B2* | 11/2015 | Grobman | G06F 21/316 |
| 2003/0055894 A1* | 3/2003 | Yeager | G06F 9/544 709/204 |
| 2003/0108159 A1* | 6/2003 | Brown | H04M 1/56 379/88.01 |
| 2003/0171975 A1* | 9/2003 | Kirshenbaum | G06Q 30/06 705/7.33 |
| 2003/0182421 A1* | 9/2003 | Faybishenko | H04L 63/08 709/224 |
| 2007/0198214 A1* | 8/2007 | Bade | G06F 21/577 702/182 |
| 2010/0048167 A1* | 2/2010 | Chow | H04L 29/12594 455/410 |
| 2012/0185910 A1* | 7/2012 | Miettinen | G06F 21/31 726/1 |
| 2012/0190386 A1* | 7/2012 | Anderson | G01C 15/04 455/456.3 |
| 2012/0226701 A1 | 9/2012 | Singh | |
| 2012/0265573 A1* | 10/2012 | Van Pelt | G06Q 10/06311 705/7.14 |
| 2013/0091540 A1* | 4/2013 | Chen | H04L 63/08 726/1 |
| 2013/0097246 A1* | 4/2013 | Zifroni | G06Q 50/01 709/204 |
| 2014/0137203 A1 | 5/2014 | Castro et al. | |
| 2014/0162598 A1* | 6/2014 | Villa-Real | H04M 1/66 455/411 |
| 2014/0282870 A1 | 9/2014 | Markwordt et al. | |
| 2015/0013018 A1* | 1/2015 | Yan | H04L 9/08 726/28 |
| 2015/0163217 A1* | 6/2015 | Lo | H04L 63/0823 726/6 |
| 2015/0256517 A1* | 9/2015 | Yan | H04L 9/0847 713/171 |

OTHER PUBLICATIONS

Louis T. Fuka, et al., "Authentication Based on Proximate Devices", U.S. Appl. No. 14/745,496, filed Jun. 22, 2015.

* cited by examiner

AUTHENTICATION BASED ON PROXIMATE DEVICES

BACKGROUND

Various embodiments of this disclosure relate to identity verification and, more particularly, to authentication based on proximate devices.

As more consumers and retailers adopt mobile payment systems, they need to ensure their transactions are secure and being made by the person claiming to be making them. Traditionally, a user's identity is verified through the use of three factors: a knowledge factor (i.e., something only the user knows, such as a password), a possession factor (i.e., something only the user has, such as a particular mobile device), and an inherence factor (i.e., something only the user is, such as biometric identification). However, none of these factors is flawless, and all are vulnerable to malicious attack.

SUMMARY

In one embodiment of this disclosure, a computer-implemented method includes, in response to an attempt by a user to perform a transaction using a computing device, accessing a communication device connected to the computing device. A presence of one or more nearby devices, with respect to the computing device, is detected through use of the communication device connected to the computing device. A mapping of nearby devices to trust levels may be applied to the one or more nearby devices. In the mapping, each group of one or more nearby devices maps to a trust level of two or more trust levels. An assigned trust level for the transaction is determined, by a computer processor, based on applying the mapping of nearby devices to trust levels. The mapping of nearby devices to trust levels is modified based on the one or more nearby devices detected. The modified mapping is used for future transactions.

In another embodiment, a system includes one or more processing devices configured, in response to an attempt by a user to perform a transaction using a computing device, to access a communication device connected to the computing device. The one or more processing devices are further configured to detect a presence of one or more nearby devices with respect to the computing device, through use of the communication device connected to the computing device. The one or more processing devices are further configured to apply, to the one or more nearby devices, a mapping of nearby devices to trust levels. In the mapping, each group of one or more nearby devices maps to a trust level of two or more trust levels. The one or more processing devices are further configured to determine an assigned trust level for the transaction based on applying the mapping of nearby devices to trust levels. The one or more processing devices are further configured to modify the mapping of nearby devices to trust levels based on the one or more nearby devices detected. The modified mapping is used for future transactions.

In yet another embodiment, a computer program product for determining a trust level for a transaction includes a computer readable storage medium having program instructions embodied therewith. The program instructions are executable by a processor to cause the processor to perform a method. The method includes, in response to an attempt by a user to perform a transaction using a computing device, accessing a communication device connected to the computing device. Further according to the method, a presence of one or more nearby devices, with respect to the computing device, is detected through use of the communication device connected to the computing device. A mapping of nearby devices to trust levels may be applied to the one or more nearby devices. In the mapping, each group of one or more nearby devices maps to a trust level of two or more trust levels. An assigned trust level for the transaction is determined, by a computer processor, based on applying the mapping of nearby devices to trust levels. The mapping of nearby devices to trust levels is modified based on the one or more nearby devices detected. The modified mapping is used for future transactions.

Additional features and advantages are realized through the techniques of the present invention. Other embodiments and aspects of the invention are described in detail herein and are considered a part of the claimed invention. For a better understanding of the invention with the advantages and the features, refer to the description and to the drawings.

BRIEF DESCRIPTION OF THE DRAWINGS

The subject matter which is regarded as the invention is particularly pointed out and distinctly claimed in the claims at the conclusion of the specification. The forgoing and other features, and advantages of the invention are apparent from the following detailed description taken in conjunction with the accompanying drawings in which:

DETAILED DESCRIPTION

Various embodiments of this disclosure are verification systems that include a novel authentication factor based on nearby detectable devices. The verification system may keep track of devices that are nearby during historical transactions, and may use those devices to determine a trust level for a current transaction. In short, the verification system may detect which devices are near a user during each transaction, and may thus determine which devices are often near the user during transactions. Before processing a new transaction, the verification system may determine which devices are nearby, and may set a trust level for the transaction based on whether the nearby devices are devices that were nearby for previous transactions. The trust level may determine whether the transaction is allowed to proceed.

Figure 1:
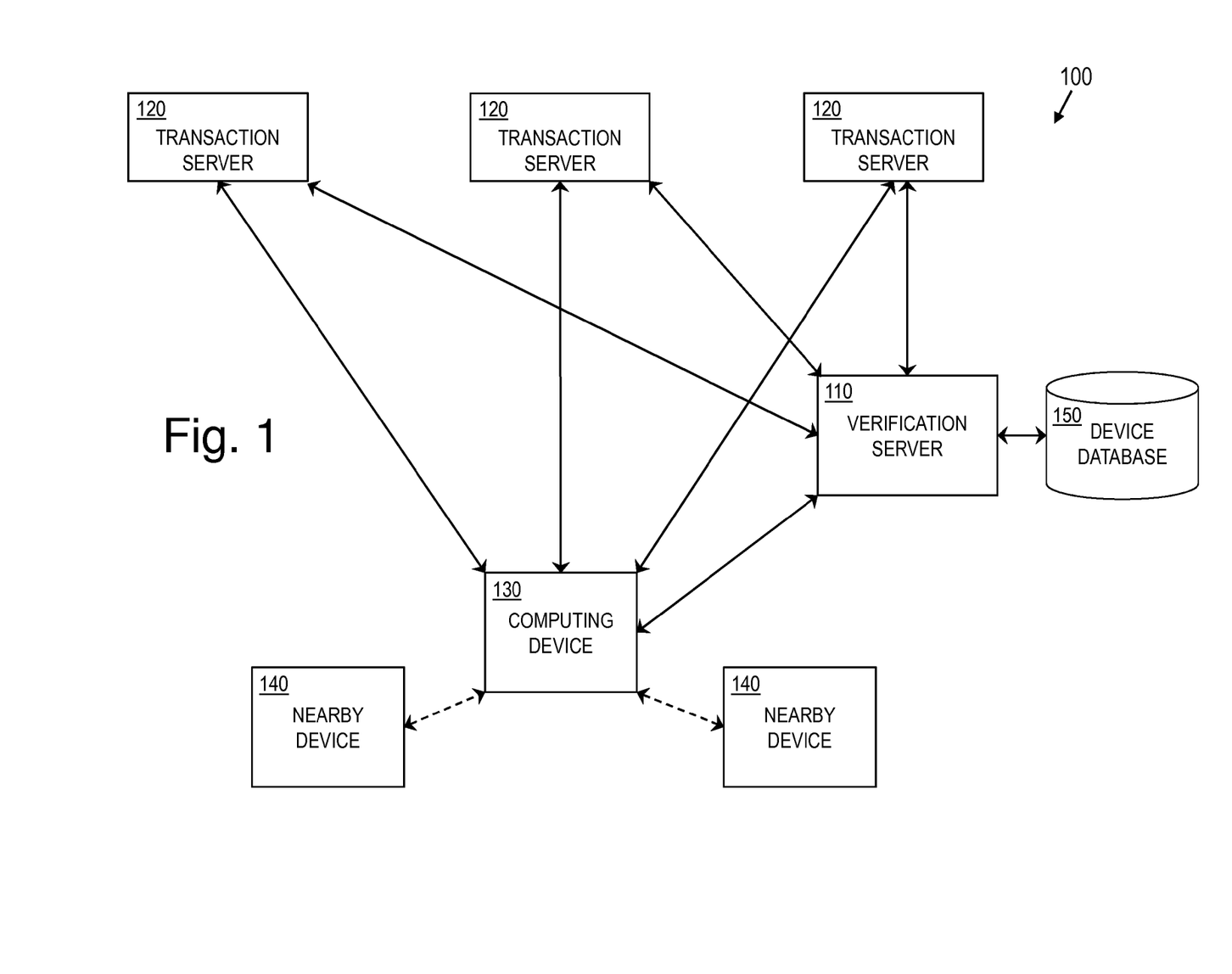
FIG. 1 is a block diagram of a verification system, according to some embodiments of this disclosure.

FIG. 1 is a block diagram of a verification system 100, according to some embodiments of this disclosure. The verification system 100 may be active during a transaction made by a user at a computing device 130. The transaction may be for example, a purchase or a modification to confidential data. The transaction may involve at least one transaction server 120, with which the computing device 130 may communicate to make the transaction. For example, the transaction server 120 may be a web server, or may be in communication with a web server, configured to deliver a website to the computing device 130 to enable the user to perform the transaction through the website (e.g., enabling the user to purchase something from the website). In some embodiments, the transaction server 120 may process, or otherwise facilitate, the transaction. For further example, if the transaction is a purchase, the transaction server 120 may be associated with a retailer from whom the purchase is being made, and the transaction server 120 may be configured to process the purchase.

Figure 2:
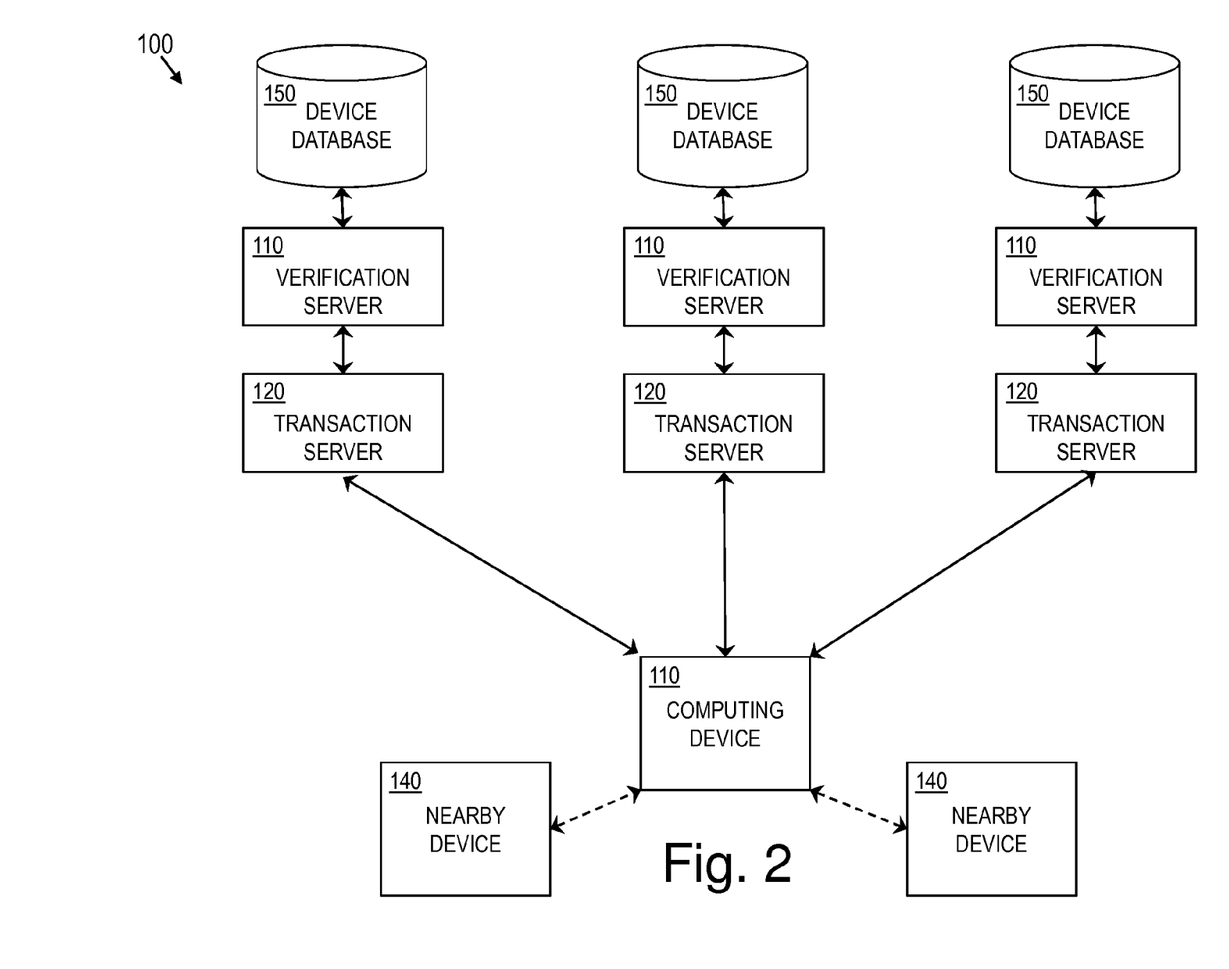
FIG. 2 is a block diagram of a second verification system, according to some embodiments of this disclosure.

The verification system may include one or more verification servers 110. In embodiments of FIG. 1, the verification system 100 may include at least one verification server 110 separate from the transaction servers 120. The verification server 110 may determine a trust level for each transaction to be performed on the transaction servers 120. FIG. 2 is a block diagram of the verification system 100, according to some other embodiments. As shown, in these embodiments, each transaction server 120 may be associated with a dedicated verification server 110. Each verification server 110 may determine trust levels for its associated transaction server 120. In this case, although each verification server 110 is shown in FIG. 2 as being distinct from its associated transaction server 120, this need not be the case. Rather, in some embodiments, a transaction server 120 and a verification server 110 may use overlapping hardware, software, or both. It will be understood that the verification system 100 may alternatively use a hybrid of the arrangements shown in FIGS. 1 and 2, where at least one verification server 110 is associated with a particular transaction server 120, and at least one verification server 110 is separate from the transaction servers 120. In this case, the separate verification server 110 may be involved in transactions for the transaction servers 120 that do not have dedicated verification servers 110.

In some embodiments, as will be described in more detail later in this disclosure, the verification system 100 may operate in a cloud computing environment. For example, the one or more verification servers 110, the one or more transaction servers 120, and the one or more device databases 150 may operate in a cloud, remote from the computing device 130 from which the user is attempting to make a transaction.

When a user attempts to make a transaction on a transaction server 120, the verification system 100, by way of a verification server 110, may have access to certain information on the computing device 130. In some embodiments, the user may be asked to grant permission to the verification system 100 for access to such information. The information on the computing device 130 accessible by the verification system 100 may relate to other devices 140 detected by the computing device 130 as being nearby.

The computing device 130 may be configured to detect other devices 140 by various communication mechanisms, such as through the use of a Bluetooth chip, a WiFi chip, or other wireless or wired communication device installed on, or otherwise connected to, the computing device 130. These communication mechanisms may detect nearby devices 140, traditionally for the purpose of enabling a connection to these nearby devices 140. By gaining access to the computing device's communication mechanisms, the verification system 100 may thus detect nearby devices 140. For example, and not by way of limitation, if the computing device 130 is nearby a mobile phone with Bluetooth, and if the mobile phone is within Bluetooth range of the computing device 130, the computing device 130 may detect that the mobile phone is nearby. Having access to the computing device's Bluetooth, the verification system 100 may likewise detect the proximity of the mobile phone. It will therefore be understood that the terms "nearby," "proximate," and "present," as used herein, refer to a range over which the computing device is able to detect nearby devices 140.

Each nearby device may have a unique identifier, such as, for example, a media access control (MAC) address. Through the computing device's hardware, the verification system 100 may be capable of detecting a nearby device's unique identifier. Having access to information related to nearby devices, the verification system 100 may thus be aware of specifically which devices are nearby.

The verification system 100 may include at least one device database 150. In some embodiments, the device database 150 may reside on the verification server 110, in which case there may be a distinct device database 150 for each verification server 110. For improved results, these device databases 150 may be synchronized through the exchange of data between the various verification servers 110. In some other embodiments, a single device database 150 may be shared among the verification servers 110 if multiple verification servers 110 are being used. It will be understood that the device database 150 need not be a relational database but, rather, may be various devices configured to maintain and manage data.

The verification system 100, such as by way of the applicable verification server 110, may store in the device database 150 information about nearby devices 140 that are determined to be near a user's computing device 130 during a transaction being performed by the user. Having stored information about nearby devices 140 for past transactions, the device database 150 may include information about which nearby devices 140 were nearby for each of various historical transactions.

It is presumed that other devices 140 that are often nearby the computing device 130 during transactions are owned by or associated with friends, family members, business colleagues, or other associates of the user of the computing device 130. Thus, when these other devices 140 are nearby for a particular transaction, the verification system 100 can thus assume that the computing device 130 is in the hands of its rightful user and has not been stolen. Thus, information about which devices 140 have been nearby a user during past transactions may be useful in verifying the user's identity.

Because each user is expected to have his own group of associates, differing from one user to another, the verification system 100 may maintain a profile, which may be stored in the device database 150, for each user. The profile may include information about nearby devices 140 for past transactions, and may include a mapping used to map nearby devices 140 to trust levels. In some device-based embodiments, each profile may be associated with a particular computing device 130, and may be related to a history of transactions that took place from that computing device 130. In contrast, in some user-based embodiments, each profile may be associated with a particular user and may follow that user regardless of which computing device 130 the user utilizes to make transactions. In such a user-based embodiment, a user may be required to authenticate himself to the verification system 100. This authentication may take conventional forms, including, for example, a user name and password. When a user has been authenticated, the verification system 100 may then use the information and mapping in the user's profile to determine trust levels for the user's transactions regardless of which computing device 130 the user is making those transactions from. Further, these user-based embodiments, the computing device 130 being used to make a transaction may be treated as a nearby device 140 for the purpose of determining trust levels. In other words, for example, use of the same computing device 130 to make a current transaction as was frequently for past transactions may result in an increased trust level for the current transaction.

The mapping of nearby devices 120 to trust levels, and therefore the assignment of a trust level for a current transaction, may be based on various factors. These factors include, for example, how frequently the devices 140 that are currently nearby were also present for past transactions; how many times each nearby device 140 was present for past transactions; and how many devices 140 are present that were present for one or more past transactions.

As mentioned above, the verification system 100 may assign a trust level to each transaction based on which devices 140 are detected as being proximate the user's current computing device 130 when the user makes the transaction. More specifically, in some embodiments, the applicable verification server 110 for the transaction may assign the trust level. Various mechanisms may be used to determine how each nearby device 140 or set of nearby devices 140 maps to a corresponding trust level. For example, and not by way of limitation, one or more thresholds may be set to establish trust levels. When a device 140 currently determined to be nearby has been present for a quantity of past transactions at least equal to a first threshold, then a first trust level may be assigned to the current transaction. Analogously, when a device 140 currently determined to be nearby has been present for a quantity of past transactions at least equal to a second threshold, then a second trust level may be assigned to the current transaction; and when a device 140 currently determined to be nearby has been present for a quantity of past transactions at least equal to a third threshold, then a third trust level may be assigned to the current transaction. In this example, presence for a greater number of transactions may lead to a higher trust level being assigned.

With respect to combinations of nearby devices 140, the verification system 100 may take note of when a nearby first device 140 has been present for past transactions only under certain circumstances, such as when a nearby second device 140 was also present. In that case, the presence of the nearby first device 140 without the second device 140 also being nearby may deemed insufficient for a high trust level, even when the nearby first device has often been present (along with the second device 140) during past transactions.

In some embodiments, the particular trust level that is assigned based on the proximity of a group of one or more nearby devices 140 may be dynamic, in that the trust level may evolve over time for each group of one or more nearby devices 140. For instance, when a computing device 130 is first involved in the verification system 100, there may be no historical data related to that computing device 130, and thus no other devices 140 may afford trust levels other than a default trust level. The default trust level may be the trust level used if no nearby devices afford an alternative trust level. Over time, as more transactions are performed with the computing device 130, the device database 150, which may be updated with information about nearby devices 140 of past transactions, may show that certain other devices 140 are frequently nearby the computing device 130 during these past transactions. Thus, the verification system 100 may determine that one or more of these other devices 140, alone or in groups of devices 140, afford an increased level of trust. In other words, for each user profile, the mapping from nearby devices 140 to trust levels may be dynamic, being built and changing over time as transactions take place.

However, in some embodiments, certain devices 140 or groups of devices 140 may afford a transaction a certain trust level by default. These devices may be specified by the user. For example, and not by way of limitation, a user may instruct that specified devices 140 belonging to the user's parent or best friend always result in a certain trust level (e.g., the highest trust level). This feature may enable to user to attain a high trust level for some transactions that are nearby certain devices 140, regardless of the history of transactions near those devices 140. This feature may, however, provide a loophole for a malicious attacker, who may specify that his own device 140 affords a high trust level. Thus, to avoid this attack, some embodiments of the verification system 100 may allow devices 140 to be specified as affording specific trust levels only when a high or highest trust level is currently active. In other words, the user may be enabled to specify that a certain device 140 leads to high trust level only when the current trust level based on nearby devices 140 is high. More specifically, in some embodiments, the user may be allowed to specify for a device or group of devices 140 a trust level that is no higher than the current trust level at the time of making the specification.

In some embodiments, the verification system 100 may maintain knowledge about devices 140 that have been present one or more times in the past during fraudulent transactions, or attempts to make fraudulent transactions. Such devices 140 may be deemed untrusted by the verification system 100. These untrusted devices 140 need not be associated with only a single user profile in the device database 150. Rather, after a device 140 is deemed untrusted, its presence may affect the trust levels for some or all users of the verification system 100. If an untrusted device 140 is present during a transaction, the verification system 100 may assign a low or lowest trust level, or may reduce the trust level that would have otherwise been assigned to the transaction, regardless of the user making the transaction. Further, in some embodiments, the verification system 100 may initiate an alert on the user's computing device 130 to indicate the presence of an untrusted device 140. For example, and not by way of limitation, the alert may be a change in the color of a menu bar, pointer, or scroll bar. Such an alert may indicate to the user that the current network being used to make the transaction may be an unsafe network due to the presence of the untrusted device 140.

After a trust level is set for a transaction, the applicable verification server 110 may communicate the trust level to the transaction server 120 handling the transaction. The transaction server 120 may customize the handling of the transaction based on the trust level. For example, and not by way of limitation, if the transaction is given the lowest trust level, the transaction server 120 may decline to process the transaction. If the transaction is given is medium trust level, the transaction server 120 may limit the transaction in some way (e.g., by limiting the maximum monetary amount of a purchase being made during the transaction, and disallowing any purchase over that monetary amount). If the transaction is given the highest trust level, the transaction server 120 may remove limitations from the user, and may process any transaction the user attempts.

In some embodiments, the user may provide the verification system 100 with contact information associated with one or more of the devices 140 detected as being nearby during one or more transaction. For example, and not by of limitation, the user may provide the email address or phone number of a friend whose device 140 was nearby in a completed or current transaction. This contact information may be stored in association with the user's profile in the device database 150. After a first transaction takes place, when contact information is associated with a first device 140 in the user's profile, and when the first device 140 is present for the first transaction, the verification system 100 may send notification of the first transaction to the associated contact information for the first device 140. In that manner, other parties, such as friends and family, may be notified of when their devices were used to determine a transaction's trust level. In the event another party has no knowledge of being near the user who made the transaction during the transaction time, the other party may notify the verification system 100 or the user of potential fraud.

Some embodiments of the verification system 100 may be used at points of sale, and need not be limited to remote purchases. For example, and not by way of limitation, a computing device 130 making a transaction may be a gas pump at a gas station configured to accept payment at the gas pump. In this case, the user may be identified by his credit card, or other payment method. The nearby devices 140 for which information is stored in the device database 150 may be vehicles. Many vehicles now include Bluetooth or WiFi, and thus may be detectable by the gas pump, which may also be equipped with a communication mechanism used for detection, such as Bluetooth or WiFi. With this arrangement, the verification system 100 may set a low trust level if no currently nearby vehicles were present during past gas purchases with the credit card. In contrast, a high trust level may be given if one or more nearby vehicles were present for past gas purchases with the credit card. Thus, the verification system 100 may help ensure the credit card is not being used to purchase gas for unrecognized vehicles.

It will be understood that the point-of-sale embodiments of the verification system 100 are not limited to gas stations. The verification server may be used for the purchase of various goods and services, where a computing device 130 involved in the transaction is capable of detecting nearby devices 140. For example, and not by way of limitation, the verification system 100 may be used for retail sales when a cash register is configured to detect nearby devices 140.

Some other embodiments of the verification system 100 may be used to determine a trust level of a user's current company, for purposes other than performing transactions. For example, another party, such as a parent, may use the verification system 100 to view the devices 140 detected as currently being nearby a user's computing device 130. The amount of detail visible by the other party viewing information about nearby devices 140 for a particular computing device 130 may vary based on the embodiment or based on user settings. For example, the other party may be able to view only the trust level that would be assigned to a transaction at the present moment, based on devices 140 nearby the computing device 130 in question. Alternatively, the other party may be able to see which specific devices are nearby. Using the verification system 100, the other party viewing the information about nearby devices 140 may gain peace of mind in the fact that the user is near known people owning those nearby devices 140, without violating the privacy of the user by obtaining the user's exact location. Thus, the verification system 100 may be used to provide peace of mind, while maintaining relative user privacy.

Figure 3:
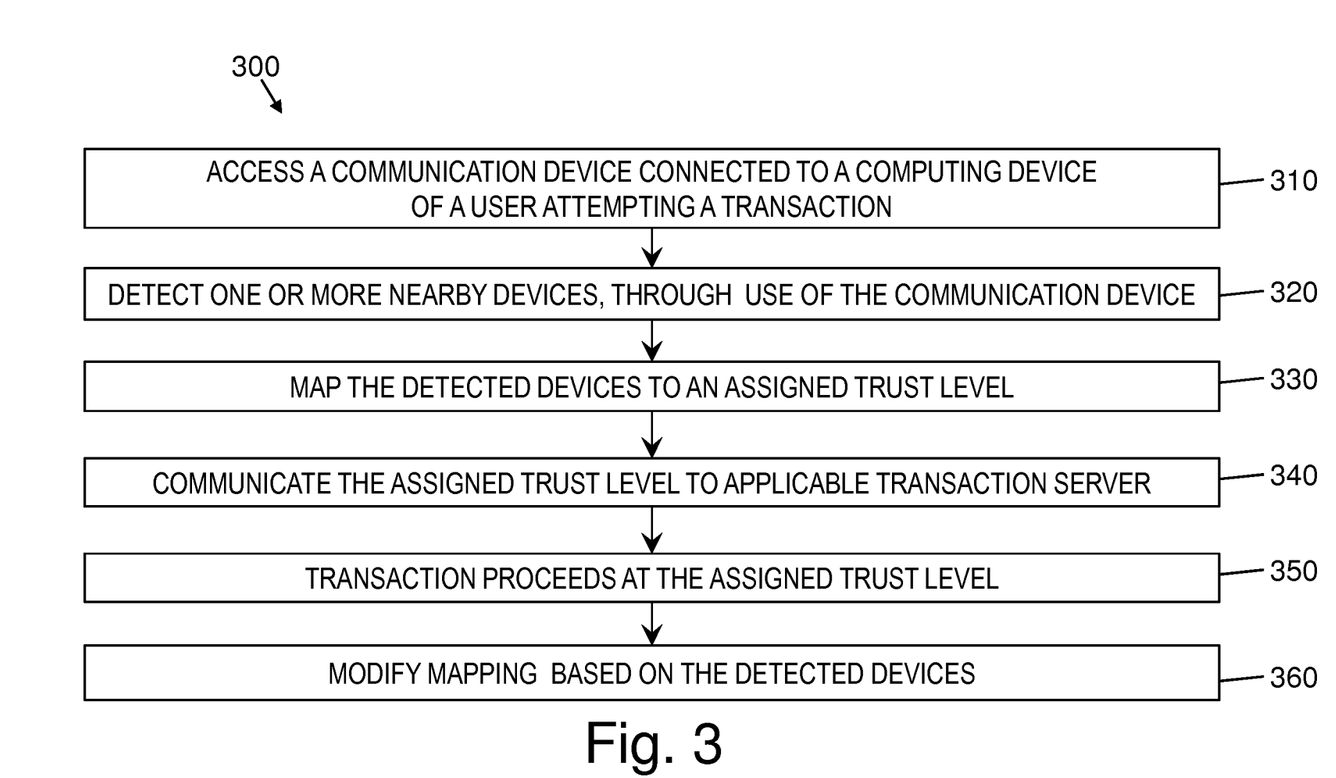
FIG. 3 is a flow diagram of a method for determining a trust level for a transaction, according to some embodiments of this disclosure.

FIG. 3 is a flow diagram of a method 300 for determining a trust level for a transaction, according to some embodiments of this disclosure. As shown, at block 310, one or more devices 140 are detected as being nearby a user during a current transaction. At block 320, the one or more devices 140 may be mapped to a trust level for the transaction, using on a mapping based on past transactions. At block 330, the trust level to which the detected one or more devices were mapped may be communicated to the applicable transaction server 120 as an assigned trust level for the current transaction, to enable the transaction server 120 to manage the transaction according to that assigned trust level. At block 340, the transaction may proceed at the assigned trust level. At block 350, the mapping for detected devices to trust levels may be modified based on the devices detected during the current transaction.

Figure 4:
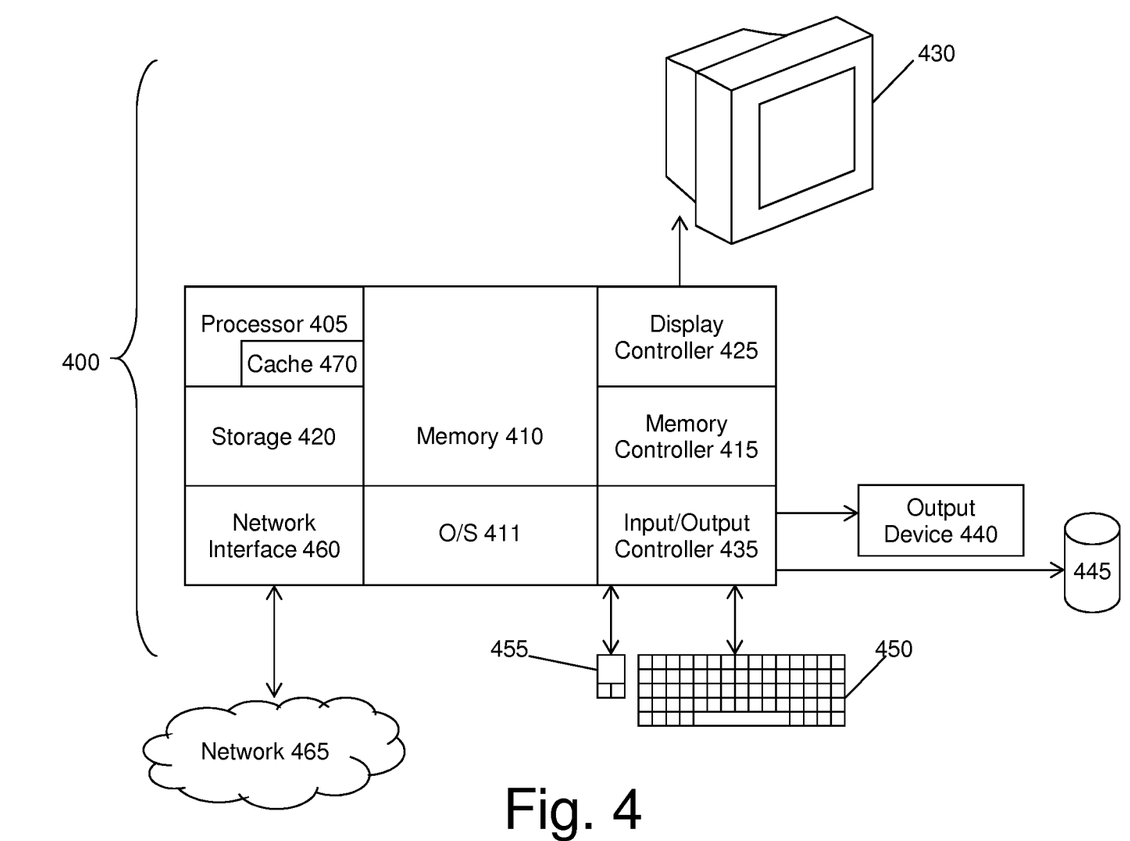
FIG. 4 is a block diagram of a computing device for implementing some or all aspects of the verification system, according to some embodiments of this disclosure.

FIG. 4 illustrates a block diagram of a computer system 400 for use in implementing a verification system or method according to some embodiments. The verification systems and methods described herein may be implemented in hardware, software (e.g., firmware), or a combination thereof. In an exemplary embodiment, the methods described may be implemented, at least in part, in hardware and may be part of the microprocessor of a special or general-purpose computer system 400, such as a personal computer, workstation, minicomputer, or mainframe computer. For example, and not by way of limitation, a computing device 130 being used to make a transaction, a nearby computing device 140, the verification server 110, or the transaction server 120 may take the form of a computer system 400 such as that shown in FIG. 4.

In some embodiments, as shown in FIG. 4, the computer system 400 includes a processor 405, memory 410 coupled to a memory controller 415, and one or more input devices 445 and/or output devices 440, such as peripherals, that are communicatively coupled via a local I/O controller 435. These input and output devices 440 and 445 may include, for example, a printer, a scanner, a microphone, and the like. Input devices such as a conventional keyboard 450 and mouse 455 may be coupled to the I/O controller 435. The I/O controller 435 may be, for example, one or more buses or other wired or wireless connections, as are known in the art. The I/O controller 435 may have additional elements, which are omitted for simplicity, such as controllers, buffers (caches), drivers, repeaters, and receivers, to enable communications.

The input and output devices 440, 445 may further include devices that communicate both inputs and outputs, for instance disk and tape storage, a network interface card (NIC) or modulator/demodulator (for accessing other files, devices, systems, or a network), a radio frequency (RF) or other transceiver, a telephonic interface, a bridge, a router, and the like.

The processor 405 is a hardware device for executing hardware instructions or software, particularly those stored in memory 410. The processor 405 may be a custom made or commercially available processor, a central processing unit (CPU), an auxiliary processor among several processors associated with the computer system 400, a semiconductor based microprocessor (in the form of a microchip or chip set), a macroprocessor, or other device for executing instructions. The processor 405 includes a cache 470, which may include, but is not limited to, an instruction cache to speed up executable instruction fetch, a data cache to speed up data fetch and store, and a translation lookaside buffer (TLB) used to speed up virtual-to-physical address translation for both executable instructions and data. The cache 470 may be organized as a hierarchy of more cache levels (L1, L2, etc.).

The memory 410 may include one or combinations of volatile memory elements (e.g., random access memory, RAM, such as DRAM, SRAM, SDRAM, etc.) and nonvolatile memory elements (e.g., ROM, erasable programmable read only memory (EPROM), electronically erasable programmable read only memory (EEPROM), programmable read only memory (PROM), tape, compact disc read only memory (CD-ROM), disk, diskette, cartridge, cassette or the like, etc.). Moreover, the memory 410 may incorporate electronic, magnetic, optical, or other types of storage media. Note that the memory 410 may have a distributed architecture, where various components are situated remote from one another but may be accessed by the processor 405.

The instructions in memory 410 may include one or more separate programs, each of which comprises an ordered listing of executable instructions for implementing logical functions. In the example of FIG. 4, the instructions in the memory 410 include a suitable operating system (OS) 411. The operating system 411 essentially may control the execution of other computer programs and provides scheduling, input-output control, file and data management, memory management, and communication control and related services.

Additional data, including, for example, instructions for the processor 405 or other retrievable information, may be stored in storage 420, which may be a storage device such as a hard disk drive or solid state drive. The stored instructions in memory 410 or in storage 420 may include those enabling the processor to execute one or more aspects of the verification systems and methods of this disclosure.

The computer system 400 may further include a display controller 425 coupled to a display 430. In some embodiments, the computer system 400 may further include a network interface 460 for coupling to a network 465. The network 465 may be an IP-based network for communication between the computer system 400 and an external server, client and the like via a broadband connection. The network 465 transmits and receives data between the computer system 400 and external systems. In some embodiments, the network 465 may be a managed IP network administered by a service provider. The network 465 may be implemented in a wireless fashion, e.g., using wireless protocols and technologies, such as WiFi, WiMax, etc. The network 465 may also be a packet-switched network such as a local area network, wide area network, metropolitan area network, the Internet, or other similar type of network environment. The network 465 may be a fixed wireless network, a wireless local area network (LAN), a wireless wide area network (WAN) a personal area network (PAN), a virtual private network (VPN), intranet or other suitable network system and may include equipment for receiving and transmitting signals.

Verification systems and methods according to this disclosure may be embodied, in whole or in part, in computer program products or in computer systems 400, such as that illustrated in FIG. 4.

It is understood in advance that although this disclosure includes a detailed description on cloud computing, implementation of the teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g. networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure comprising a network of interconnected nodes.

Figure 5:
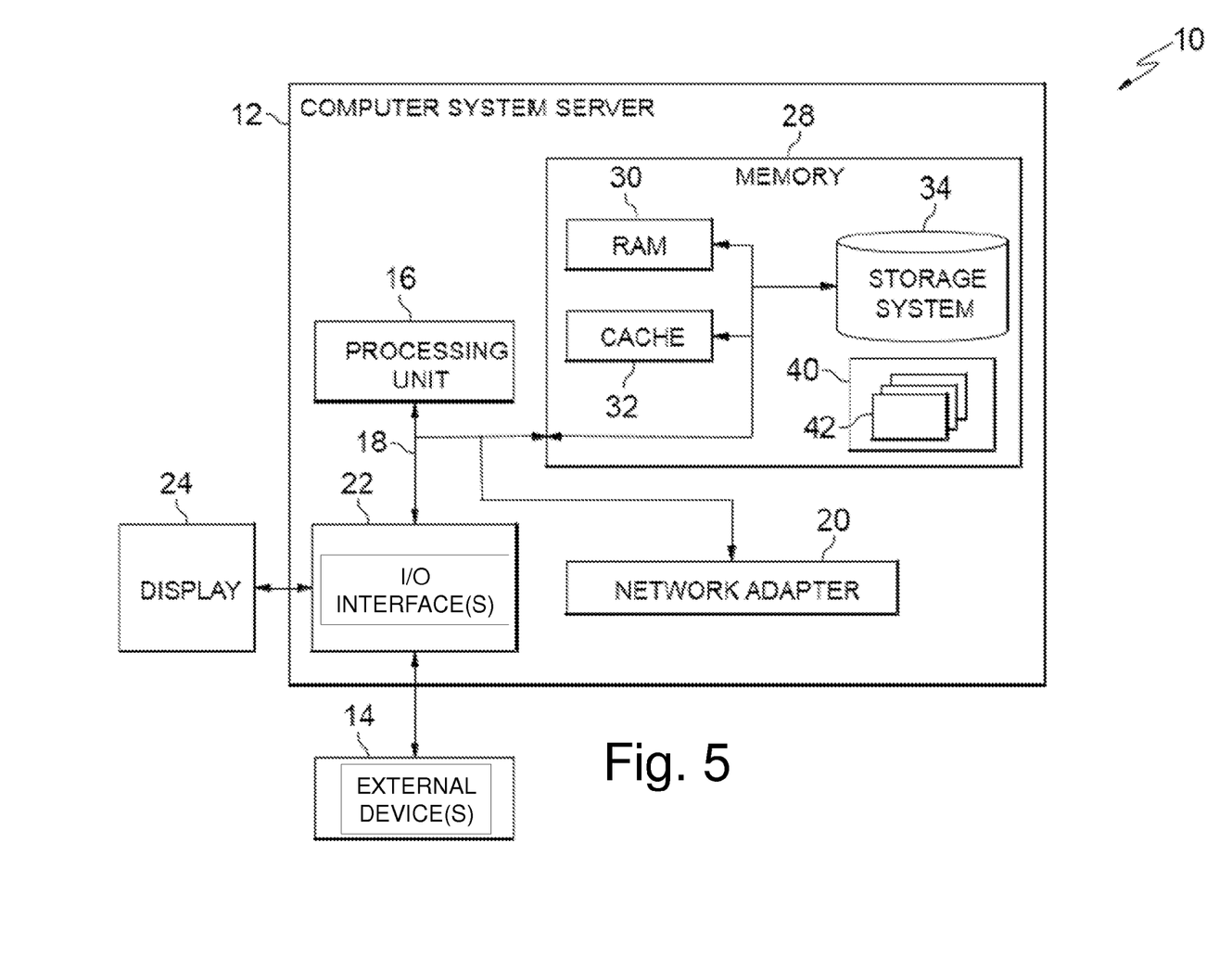
FIG. 5 depicts a cloud computing node, according to some embodiments of this disclosure.

Referring now to FIG. 5, a schematic of an example of a cloud computing node is shown. Cloud computing node 10 is only one example of a suitable cloud computing node and is not intended to suggest any limitation as to the scope of use or functionality of embodiments of the invention described herein. Regardless, cloud computing node 10 is capable of being implemented and/or performing any of the functionality set forth hereinabove.

In cloud computing node 10 there is a computer system/server 12, which is operational with numerous other general purpose or special purpose computing system environments or configurations. Examples of well-known computing systems, environments, and/or configurations that may be suitable for use with computer system/server 12 include, but are not limited to, personal computer systems, server computer systems, thin clients, thick clients, hand-held or laptop devices, multiprocessor systems, microprocessor-based systems, set top boxes, programmable consumer electronics, network PCs, minicomputer systems, mainframe computer systems, and distributed cloud computing environments that include any of the above systems or devices, and the like.

Computer system/server 12 may be described in the general context of computer system-executable instructions, such as program modules, being executed by a computer system. Generally, program modules may include routines, programs, objects, components, logic, data structures, and so on that perform particular tasks or implement particular abstract data types. Computer system/server 12 may be practiced in distributed cloud computing environments where tasks are performed by remote processing devices that are linked through a communications network. In a distributed cloud computing environment, program modules may be located in both local and remote computer system storage media including memory storage devices.

As shown in FIG. 5, computer system/server 12 in cloud computing node 10 is shown in the form of a general-purpose computing device. The components of computer system/server 12 may include, but are not limited to, one or more processors or processing units 16, a system memory 28, and a bus 18 that couples various system components including system memory 28 to processor 16.

Bus 18 represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnects (PCI) bus.

Computer system/server 12 typically includes a variety of computer system readable media. Such media may be any available media that is accessible by computer system/server 12, and it includes both volatile and non-volatile media, removable and non-removable media.

System memory 28 can include computer system readable media in the form of volatile memory, such as random access memory (RAM) 30 and/or cache memory 32. Computer system/server 12 may further include other removable/non-removable, volatile/non-volatile computer system storage media. By way of example only, storage system 34 can be provided for reading from and writing to a non-removable, non-volatile magnetic media (not shown and typically called a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each can be connected to bus 18 by one or more data media interfaces. As will be further depicted and described below, memory 28 may include at least one program product having a set (e.g., at least one) of program modules that are configured to carry out the functions of embodiments of the invention.

Program/utility 40, having a set (at least one) of program modules 42, may be stored in memory 28 by way of example, and not limitation, as well as an operating system, one or more application programs, other program modules, and program data. Each of the operating system, one or more application programs, other program modules, and program data or some combination thereof, may include an implementation of a networking environment. Program modules 42 generally carry out the functions and/or methodologies of embodiments of the invention as described herein.

Computer system/server 12 may also communicate with one or more external devices 14 such as a keyboard, a pointing device, a display 24, etc.; one or more devices that enable a user to interact with computer system/server 12; and/or any devices (e.g., network card, modem, etc.) that enable computer system/server 12 to communicate with one or more other computing devices. Such communication can occur via Input/Output (I/O) interfaces 22. Still yet, computer system/server 12 can communicate with one or more networks such as a local area network (LAN), a general wide area network (WAN), and/or a public network (e.g., the Internet) via network adapter 20. As depicted, network adapter 20 communicates with the other components of computer system/server 12 via bus 18. It should be understood that although not shown, other hardware and/or software components could be used in conjunction with computer system/server 12. Examples, include, but are not limited to: microcode, device drivers, redundant processing units, external disk drive arrays, RAID systems, tape drives, and data archival storage systems, etc.

Figure 6:
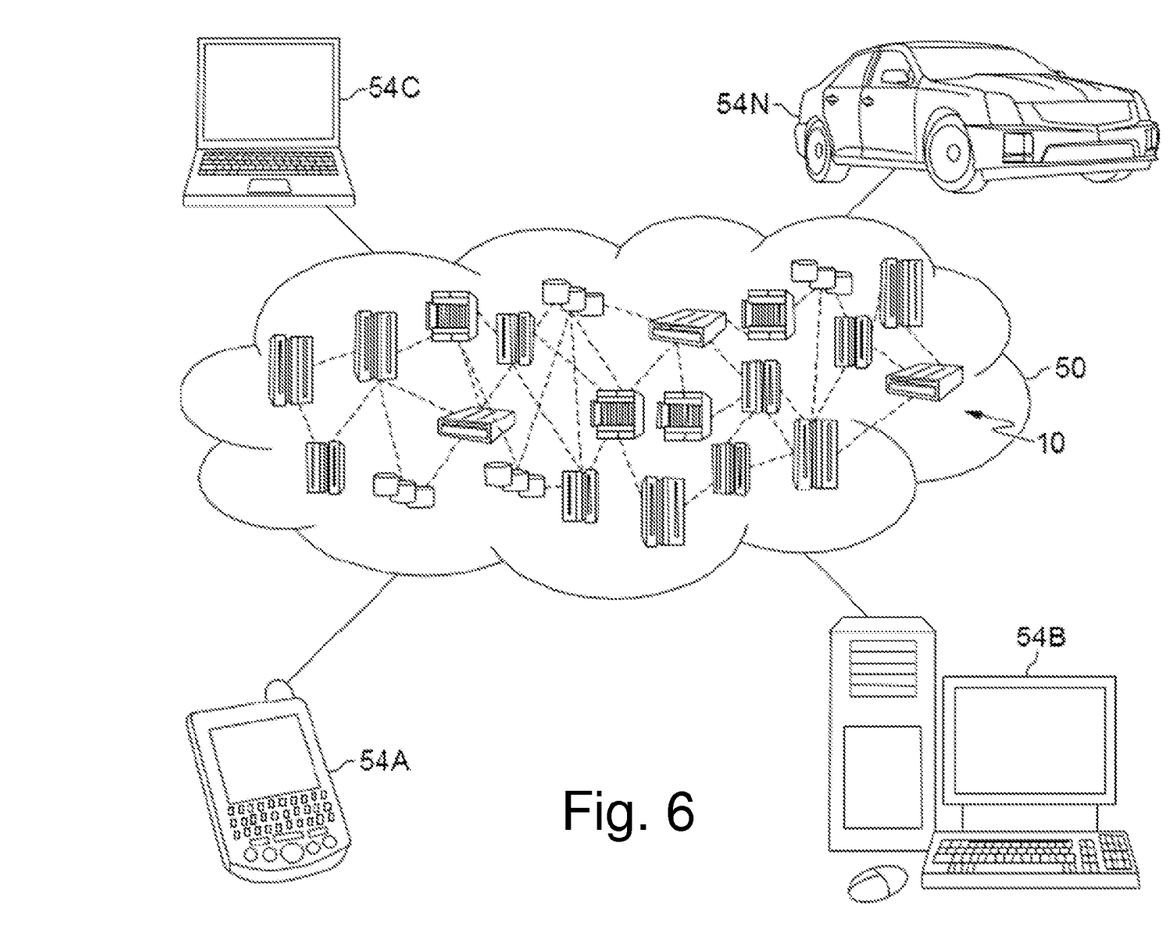
FIG. 6 depicts a cloud computing environment, according to some embodiments of this disclosure.

Referring now to FIG. 6, illustrative cloud computing environment 50 is depicted. As shown, cloud computing environment 50 comprises one or more cloud computing nodes 10 with which local computing devices used by cloud consumers, such as, for example, personal digital assistant (PDA) or cellular telephone 54A, desktop computer 54B, laptop computer 54C, and/or automobile computer system 54N may communicate. Nodes 10 may communicate with one another. They may be grouped (not shown) physically or virtually, in one or more networks, such as Private, Community, Public, or Hybrid clouds as described hereinabove, or a combination thereof. This allows cloud computing environment 50 to offer infrastructure, platforms and/or software as services for which a cloud consumer does not need to maintain resources on a local computing device. It is understood that the types of computing devices 54A-N shown in FIG. 6 are intended to be illustrative only and that computing nodes 10 and cloud computing environment 50 can communicate with any type of computerized device over any type of network and/or network addressable connection (e.g., using a web browser).

Figure 7:
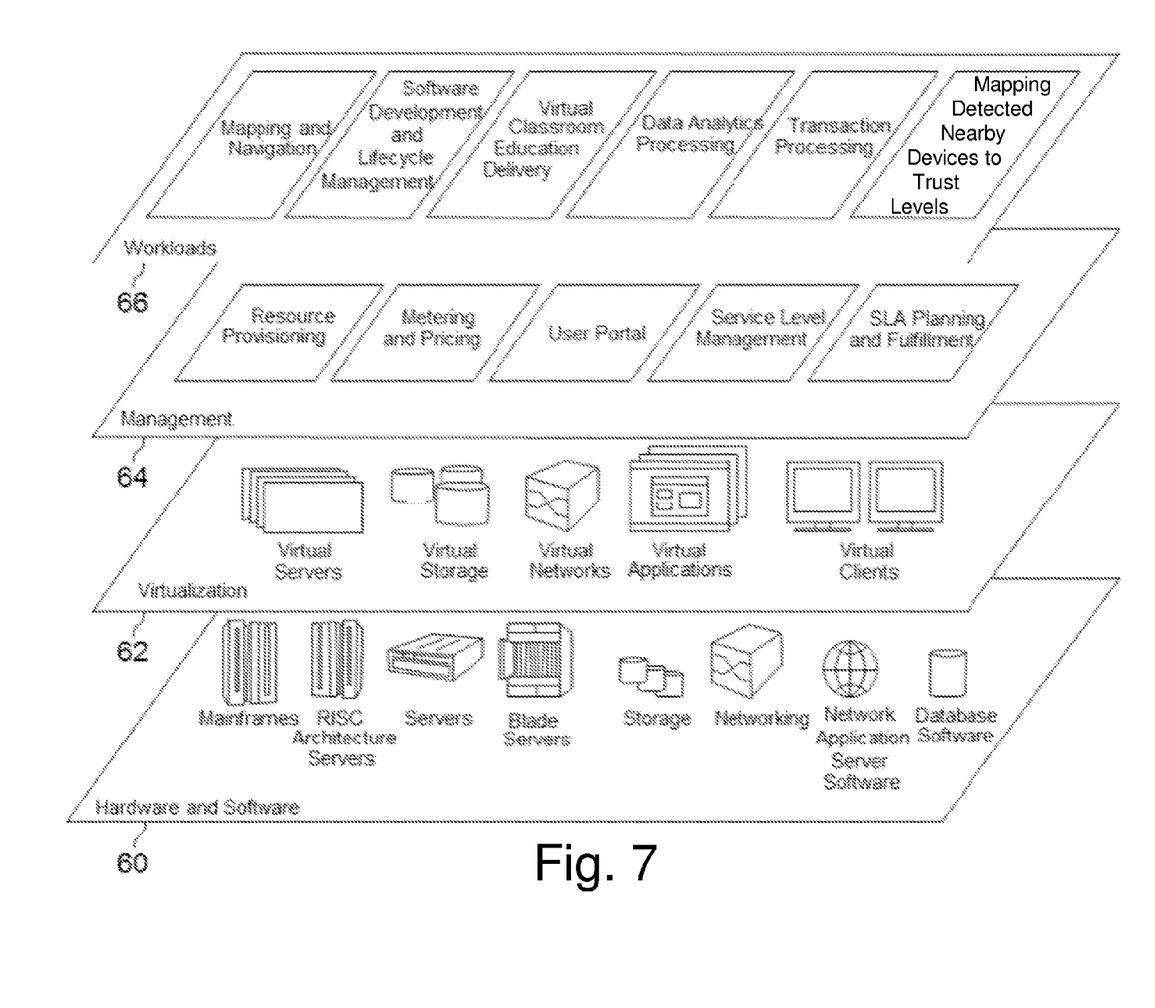
FIG. 7 depicts abstraction model layers, according to some embodiments of this disclosure.

Referring now to FIG. 7, a set of functional abstraction layers provided by cloud computing environment 50 (FIG. 6) is shown. It should be understood in advance that the components, layers, and functions shown in FIG. 7 are intended to be illustrative only and embodiments of the invention are not limited thereto. As depicted, the following layers and corresponding functions are provided:

Hardware and software layer 60 includes hardware and software components. Examples of hardware components include: mainframes; RISC (Reduced Instruction Set Computer) architecture based servers; storage devices; networks and networking components. In some embodiments, software components include network application server software.

Virtualization layer 62 provides an abstraction layer from which the following examples of virtual entities may be provided: virtual servers; virtual storage; virtual networks, including virtual private networks; virtual applications and operating systems; and virtual clients.

In one example, management layer 64 may provide the functions described below. Resource provisioning provides dynamic procurement of computing resources and other resources that are utilized to perform tasks within the cloud computing environment. Metering and Pricing provide cost tracking as resources are utilized within the cloud computing environment, and billing or invoicing for consumption of these resources. In one example, these resources may comprise application software licenses. Security provides identity verification for cloud consumers and tasks, as well as protection for data and other resources. User portal provides access to the cloud computing environment for consumers and system administrators. Service level management provides cloud computing resource allocation and management such that required service levels are met. Service Level Agreement (SLA) planning and fulfillment provide pre-arrangement for, and procurement of, cloud computing resources for which a future requirement is anticipated in accordance with an SLA.

Workloads layer 66 provides examples of functionality for which the cloud computing environment may be utilized. Examples of workloads and functions which may be provided from this layer include: mapping and navigation; software development and lifecycle management; virtual classroom education delivery; data analytics processing; transaction processing; and mapping detected nearby devices 140 to trust levels.

Technical effects and benefits of some embodiments include the ability to expand identity verification based on the presence on devices, and the owners of those devices, that have earned trust. If a computing device 130 or user account with an online retailer is compromised, the verification system 100 may still be able to detect fraud, due to the lack of recognized devices nearby. Thus, the verification system may act as a last line of defense in some situations.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements in the claims below are intended to include any structure, material, or act for performing the function in combination with other claimed elements as specifically claimed. The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiments were chosen and described in order to best explain the principles of the invention and the practical application, and to enable others of ordinary skill in the art to understand the invention for various embodiments with various modifications as are suited to the particular use contemplated.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Java, Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A system, comprising:
one or more hardware processing devices configured to:
in response to an attempt by a user to perform a transaction using a computing device, access a communication device connected to the computing device;
detect, through use of the communication device connected to the computing device, a presence of a current set of nearby devices, wherein each of the current set of nearby devices is located geographically nearby the computing device when the transaction is attempted;
apply, to the current set of nearby devices located geographically nearby the computing device when the transaction is attempted, a dynamic mapping of devices to trust levels;
wherein, in the dynamic mapping, each potential set of nearby devices maps to a trust level of two or more trust levels, wherein the dynamic mapping is based on a record of past transactions, and wherein the record of past transactions indicates which devices were geographically nearby during the past transactions;
determine an assigned trust level for the transaction based on the applying, to the current set of nearby devices located geographically nearby the computing device when the transaction is attempted, the dynamic mapping of devices to trust levels;
identify a second computing device as being part of the current set of nearby devices located geographically nearby the computing device when the transaction is attempted; and
modify the dynamic mapping of devices to trust levels based on the current set of nearby devices located geographically nearby the computing device when the transaction is attempted;

wherein modifying the dynamic mapping results in an increased trust level when the second computing device is geographically nearby the computing device for the future transactions, responsive to the second computing device being geographically nearby the first computing device when the transaction is attempted; and wherein the modified dynamic mapping is used for future transactions.

2. The system of claim 1, wherein the dynamic mapping of nearby devices to trust levels changes as additional transactions are performed.

3. The system of claim 1, wherein determining the assigned trust level for the transaction comprises:

assigning a first trust level to the transaction if none of the current set of nearby devices having been present during past transactions of the user attempting to perform the transaction; and assigning a second trust level to the transaction if at least one of the current set of nearby devices having been present during the past transactions of the user;

wherein the second trust level is distinct from the first trust level.

4. The system of claim 1, wherein the one or more hardware processing devices are further configured to communicate the assigned trust level for the transaction to a transaction server, wherein the transaction server is configured to manage the transaction based on the assigned trust level.

5. The system of claim 1, wherein detecting the presence of the current set of nearby devices comprises detecting an untrusted device, and wherein the computer readable instructions further comprise alerting the user that the untrusted device is present.

6. The system of claim 1, wherein detecting the presence of the current set of nearby devices comprises detecting which devices are within communication range of a wireless communication mechanism on a computing device attempting to make the transaction.

7. A computer program product for determining a trust level for a transaction, the computer program product comprising a non-transitory computer readable storage medium having program instructions embodied therewith, the program instructions executable by a processor to cause the processor to perform a method comprising:

in response to an attempt by a user to perform a transaction using a computing device, accessing a communication device connected to the computing device;

detecting, through use of the communication device connected to the computing device, a presence of a current set of nearby devices, wherein each of the current set of nearby devices is located geographically nearby the computing device when the transaction is attempted;

applying, to the current set of nearby devices located geographically nearby the computing device when the transaction is attempted, a dynamic mapping of devices to trust levels;

wherein, in the dynamic mapping, each potential set of nearby devices maps to a trust level of two or more trust levels, wherein the dynamic mapping is based on a record of past transactions, and wherein the record of past transactions indicates which devices were geographically nearby during the past transactions;

determining an assigned trust level for the transaction based on the applying, to the current set of nearby devices located geographically nearby the computing device when the transaction is attempted, the dynamic mapping of devices to trust levels;

identifying a second computing device as being part of the current set of nearby devices located geographically nearby the computing device when the transaction is attempted; and modifying the dynamic mapping of devices to trust levels based on the current set of nearby devices located geographically nearby the computing device when the transaction is attempted;

wherein modifying the dynamic mapping results in an increased trust level when the second computing device is geographically nearby the computing device for the future transactions, responsive to the second computing device being geographically nearby the first computing device when the transaction is attempted; and wherein the modified dynamic mapping is used for future transactions.

8. The computer program product of claim 7, wherein the dynamic mapping of devices to trust levels changes as additional transactions are performed.

9. The computer program product of claim 7, wherein determining the assigned trust level for the transaction comprises:

assigning a first trust level to the transaction if none of the current set of nearby devices having been present during past transactions of the user attempting to perform the transaction; and assigning a second trust level to the transaction if at least one of the current set of nearby devices having been present during the past transactions of the user;

wherein the second trust level is distinct from the first trust level.

10. The computer program product of claim 7, the method further comprising communicating the assigned trust level for the transaction to a transaction server, wherein the transaction server is configured to manage the transaction based on the assigned trust level.

11. The computer program product of claim 7, wherein detecting the presence of the current set of nearby devices comprises detecting an untrusted device, and wherein the method further comprises alerting the user that the untrusted device is present.

12. The computer program product of claim 7, wherein detecting the presence of the current set of nearby devices comprises detecting which devices are within communication range of a wireless communication mechanism on the computing device on which the user is attempting to make the transaction.

* * * * *